(12) United States Patent
Kaup et al.

(10) Patent No.: US 11,975,648 B2
(45) Date of Patent: May 7, 2024

(54) COMMUNICATION LIGHT DEVICE FOR VEHICLES

(71) Applicant: HELLA GmbH & Co. KGaA, Lippstadt (DE)

(72) Inventors: Marc Kaup, Paderborn (DE); Heinrich Schaefer, Bad Wuennenberg (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 296 days.

(21) Appl. No.: 17/487,806

(22) Filed: Sep. 28, 2021

(65) Prior Publication Data
US 2022/0017009 A1 Jan. 20, 2022

Related U.S. Application Data

(63) Continuation of application No. PCT/EP2020/057070, filed on Mar. 16, 2020.

(30) Foreign Application Priority Data
Mar. 29, 2019 (DE) ...................... 10 2019 108 312.5

(51) Int. Cl.
*B60Q 1/00* (2006.01)
*B60Q 1/26* (2006.01)
(Continued)

(52) U.S. Cl.
CPC ......... *B60Q 1/0035* (2013.01); *B60Q 1/2607* (2013.01); *B60Q 1/381* (2022.05);
(Continued)

(58) Field of Classification Search
CPC .... B60Q 1/0035; B60Q 1/2607; B60Q 1/381; B60Q 1/50; B60Q 1/5035; B60Q 2400/20;
(Continued)

(56) References Cited

U.S. PATENT DOCUMENTS

| 4,556,862 A | 12/1985 | Meinershagen |
| 6,700,502 B1 * | 3/2004 | Pederson ................. F21K 9/00 340/471 |

(Continued)

FOREIGN PATENT DOCUMENTS

| BR | 102015026599 A2 * | 9/2016 | ............... B60Q 1/26 |
| CN | 2429384 Y | 5/2001 | |

(Continued)

OTHER PUBLICATIONS

International Search Report dated Jun. 9, 2020 in corresponding application PCT/EP2020/057070.

*Primary Examiner* — Jack K Wang
(74) *Attorney, Agent, or Firm* — Muncy, Geissler, Olds & Lowe, P.C.

(57) ABSTRACT

A communication light device for vehicles having a number of light sources, having an elongated optical unit for generating a light signature, having a control unit for controlling the number of light sources such that a locally and/or temporally variable light emission and/or illuminated area is generated in the longitudinal extent of the elongated optical unit, wherein the communication light device is designed as a body styling part that is arranged on an exterior of the vehicle body and extends in the horizontal direction all the way along a front end and/or all the way along a rear end of the vehicle and/or all the way or partially along a longitudinal side of the vehicle.

14 Claims, 3 Drawing Sheets

(51) Int. Cl.
*B60Q 1/38* (2006.01)
*B60Q 1/50* (2006.01)
*F21S 41/26* (2018.01)
*F21S 41/663* (2018.01)
*F21S 43/249* (2018.01)
*H05B 47/10* (2020.01)
*H05B 47/155* (2020.01)
*H05B 47/16* (2020.01)
*F21W 103/20* (2018.01)

(52) U.S. Cl.
CPC ............ *B60Q 1/50* (2013.01); *F21S 41/26* (2018.01); *F21S 41/663* (2018.01); *F21S 43/249* (2018.01); *H05B 47/10* (2020.01); *H05B 47/155* (2020.01); *H05B 47/16* (2020.01); *B60Q 1/5035* (2022.05); *B60Q 2400/20* (2013.01); *F21W 2103/20* (2018.01)

(58) Field of Classification Search
CPC ........ F21S 41/26; F21S 41/663; F21S 43/249; F21S 43/239; F21S 43/243; H05B 47/10; H05B 47/155; H05B 47/16; F21W 2103/20; B60R 2019/505
See application file for complete search history.

(56) References Cited

U.S. PATENT DOCUMENTS

| | | | |
|---|---|---|---|
| 9,007,193 B2* | 4/2015 | Boston | G08G 1/017 705/14.62 |
| 9,738,225 B1* | 8/2017 | Au | B60Q 1/50 |
| 10,252,665 B2 | 4/2019 | Sturmat | |
| 11,052,816 B2 | 7/2021 | Muegge | |
| 11,104,267 B1* | 8/2021 | Mazuir | B60Q 1/268 |
| 2008/0310850 A1* | 12/2008 | Pederson | G08B 13/19671 398/135 |
| 2013/0127340 A1 | 5/2013 | Huhn et al. | |
| 2013/0335212 A1 | 12/2013 | Purks et al. | |
| 2015/0138808 A1* | 5/2015 | Salter | F21S 43/14 362/510 |
| 2015/0236221 A1* | 8/2015 | Deak, Sr. | C08G 18/10 257/89 |
| 2016/0236613 A1 | 8/2016 | Trier | |
| 2021/0291754 A1* | 9/2021 | Topp | B23K 26/402 |
| 2021/0354623 A1* | 11/2021 | Kasuya | B60Q 3/217 |
| 2021/0381668 A1* | 12/2021 | Iwasaki | F21S 41/25 |

FOREIGN PATENT DOCUMENTS

| | | |
|---|---|---|
| DE | 19534410 A1 | 3/1997 |
| DE | 10340723 A1 | 4/2005 |
| DE | 102005001122 A1 | 7/2006 |
| DE | 102011018806 A1 | 10/2012 |
| DE | 102012017281 A1 | 3/2013 |
| DE | 102011119231 A1 | 5/2013 |
| DE | 102013007856 A1 | 11/2014 |
| DE | 102016100332 A1 | 7/2016 |
| DE | 202016103822 U1 | 8/2016 |
| DE | 102015012724 A1 | 4/2017 |
| DE | 102016001179 A1 | 8/2017 |
| DE | 102016118717 A1 | 4/2018 |
| EP | 3398815 A1 | 11/2018 |
| WO | WO2015058908 A1 | 4/2015 |

\* cited by examiner

COMMUNICATION LIGHT DEVICE FOR VEHICLES

This nonprovisional application is a continuation of International Application No. PCT/EP2020/057070, which was filed on Mar. 16, 2020, and which claims priority to German Patent Application No. 10 2019 108 312.5, which was filed in Germany on Mar. 29, 2019, and which are both herein incorporated by reference.

BACKGROUND OF THE INVENTION

Field of the Invention

The present invention relates to a communication light device for vehicles, having a number of light sources, having an elongated optical unit for generating a light signature, having a control unit for controlling the number of light sources such that a locally and/or temporally variable light emission and/or illuminated area is generated in the longitudinal extent of the elongated optical unit.

Description of the Background Art

From DE 10 2016 118 717 A1, which corresponds to US 2019/0225140, which is incorporated herein by reference, a communication light device for vehicles is known that has a multiplicity of light sources as well as an elongated optical element along which the light sources are arranged in a row. The elongated optical element is designed as an elongated lens, the light sources being provided on one longitudinal side thereof and a light-emitting surface on the opposite longitudinal side thereof. Advantageously, a homogeneous, linear light emission for producing a directional indicator can be provided by this means.

However, in the conventional art, since the communication light device is integrated into a headlamp or into a taillight of the vehicle, the recognizability of the directional indicator light function from a side observation direction with respect to the vehicle is limited. The same applies to the communication light device disclosed in WO 2015/090535 A1, which is arranged in a space-saving manner in a headlamp or in a taillight of the vehicle. A control unit influences the light sources in such a manner that a locally and/or temporally variable light emission occurs in the longitudinal extent of the optical element, which is known as a sweeping turn signal.

From DE 10 2016 001 179 A1, a communication light device with a number of light sources, with an elongated optical unit, and with a control unit for controlling the light sources in terms of a sweeping directional indicator function is known that is arranged inside the vehicle, namely in the passenger compartment. The light sources are controlled by means of the control unit as a function of navigation information in such a manner that the direction in which the vehicle is moving is visually signaled to the passenger. There is no provision for signaling external road users.

From DE 20 2016 103 822 U1, a communication light device for vehicles is known that has a number of light sources, an elongated optical unit, and a control unit for controlling the light sources. The light sources are designed as a planar light-emitting diode, which is arranged on an A-pillar of the vehicle. The control unit is designed such that the light sources are switched on and/or off sequentially so that a sweeping light effect is achieved. Because the light sources are arranged on the A-pillar of the vehicle, even though it is true that the change in direction can be displayed for other road users, nevertheless the direction of the chase light or the directional sweep effects cannot point in the direction of travel being taken, since the chase light direction is essentially perpendicular to the change in travel direction.

SUMMARY OF THE INVENTION

It is therefore an object of the present invention to improve a communication light device for vehicles such that other road users are informed of a vehicle status in a simple and effective way by means of a light signature.

To attain this object, the invention is characterized in that the communication light device is designed as a body styling part that is arranged on an exterior of the vehicle body and extends in the horizontal direction all the way along a front end and/or all the way along a rear end of the vehicle and/or all the way or partially along a longitudinal side of the vehicle.

The particular advantage of the invention is in that a light signature can be provided across the entire width of the vehicle and, if appropriate, beyond this to the side of the vehicle. For example, a person standing ahead of and to the right side of the vehicle can easily recognize that the vehicle intends to turn left in the direction of travel when the light signature is designed as a directional indicator signature. The increased recognition angle range for other road users that is associated with the invention allows for improved road safety.

A communication light device can be designed to be segmented, wherein a first body styling part is arranged on a rear end and/or on a front end and second body styling parts are arranged on opposite longitudinal sides of the vehicle, so that a front and/or rear communication light device extends on the rear or front end and the longitudinal side of the vehicle, with the inclusion of corner regions. Advantageously, a recognizability of the communication light device is made possible even for road users positioned to the side of the vehicle. Thus, for example, a bicycle rider moving to the side can recognize more quickly the direction in which the vehicle intends to turn, to the left or to the right.

The communication light device can be designed to be segmented in such a manner that a central segment is integrated into a radiator grille component. Other segments are integrated into headlights or taillights. Advantageously, the communication light device can thus not only be integrated into headlights and taillights that are known per se, but also into a radiator grille component so that the costs are reduced.

The body styling part can extend at least continuously from a first end region of the rear and/or front end of the vehicle to a second end region of the same rear or front end of the vehicle. Preferably the body styling part is designed as a single component, so that it is additionally mounted on a headlight or a taillight on the vehicle. The communication display function or directional indicator function is thus arranged in a different housing than the other signal light functions of the vehicle. Existing taillights or headlights need not be modified, so that the directional indicator function according to the invention, for example, can be offered to customers as an option.

The elongated optical unit can be designed as a linear lens element whose first longitudinal side is designed as a light input surface and whose opposite second longitudinal side is designed as a light output surface. Advantageously, a homogeneous illumination can be created by this means. According to an improvement of the invention, the control unit has a controller so that a row of light sources is switched on in sequence individually and/or in groups, or is switched on dimmed, from a first end of the same to a second end of the same, and switched off, wherein an increase of an illumination intensity takes place area by area in the switch-on direction. Advantageously, a sweeping turn-signal function (chase light) is provided thereby with an increase in the brightness of a portion of the device, preferably at the end of the same, that is relevant from a signaling perspective. The attention-getting nature of the signal function is further increased as a result of the increase in brightness.

In addition to a linear lens element with which a row of light sources is associated, the optical unit can include, in an end region of the linear lens element, a light guide arranged offset to the same in the main direction of emission, with which light guide an additional light source is associated. The light guide therefore has a substantially shorter length than the linear lens element, which preferably extends across the entire length of the rear/front end. The second light source is not turned on until a section of the linear lens element that is covered by the light guide in projection perpendicular to the main direction of emission lights up. In this way, a separate control of a sweep function and a turn-signal function is accomplished. The turn-signal function created by the second light source and the light guide is limited to an end region of the rear or front end, whereas the sweeping light function covers a larger section, preferably the entire length of the rear or front end.

The switch-on/switch-off frequency at which the first light source and the second light source are operated can be identical. The sweep frequency thus corresponds to the flash frequency. A visual and spatial highlighting of the directional indicator is therefore achieved.

The segments of the communication light device can wrap continuously around a vertical axis of the vehicle so that in effect an annular belt extends along the vehicle body, preferably in the horizontal direction. By appropriate control of the segments of the communication light device, the light sources are switched on periodically and with a time shift in the switch-on direction, starting from one region, up to an end region of the wraparound communication light ring thus formed. As a result, a chase light runs in the opposite direction from the starting point until it terminates at a common end or at a mutually separated end. If the optical unit is designed such that a multiplicity of illuminated symbols, for example arrow symbols, can be produced in each segment, then the chase light can move toward specific body components as a function of the current vehicle status. For example, the arrow symbols can point periodically toward a door of the vehicle that is still open even though the vehicle driver has locked the vehicle with the remote control after parking the vehicle.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

A communication light device according to the invention can be used in multi-track vehicles such as automobiles, for example, to create an elongated light signature, in particular for signaling a change in the vehicle's driving direction to other road users (directional indicator signature).

The communication light device includes at least one body styling part 1, 1', 1", which in each case is mounted on a front end 2, a rear end 3, and, if appropriate, on opposite longitudinal sides 11, 13 of the vehicle. The body styling part is attached to the vehicle body on the exterior.

Figure 1:
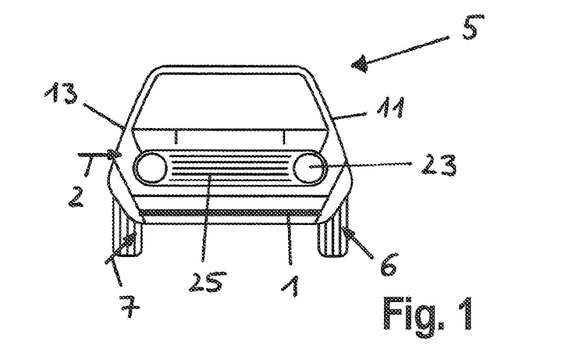
FIG. 1 shows a front view of a multi-track vehicle with a communication light device according to the invention.
Figure 2:
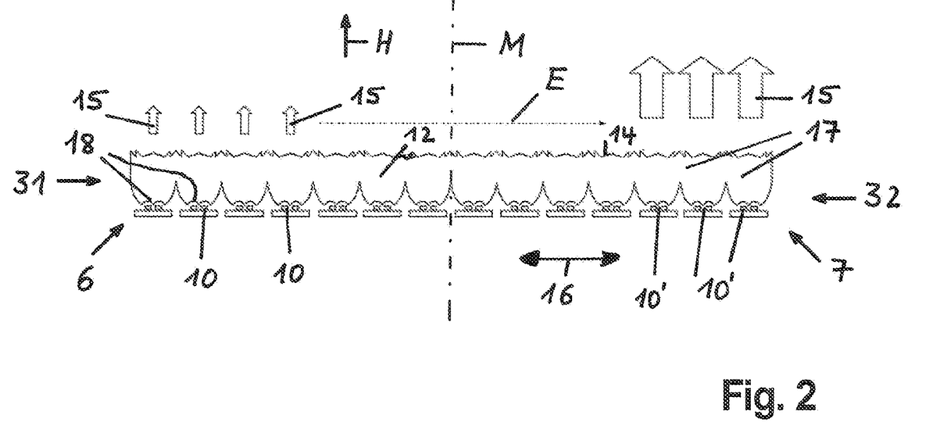
FIG. 2 shows a schematic top view of the communication light device.

In accordance with an example of the invention according to FIGS. 1 and 2 of the communication light device, this device is only arranged on the front end 2 and the rear end 3 of a vehicle 5, wherein the front body styling part 1 having in a single housing [sic; should read either "having a single housing" or "in a single housing"] extends from a first end region 6 of the front end 2 to an opposite second end region 7 of the same and a rear body styling part 1' extends from a first end region 8 of the rear end 3 to an opposite second end region 9 of the rear end 3. The body styling part 1, 1' is thus elongated in design, wherein the length of the body styling part 1, 1' corresponds essentially to a width of the vehicle 5. The entire width of the vehicle 5 is therefore used for the directional indicator function.

As is evident from FIG. 2, the body styling part 1 arranged on the front end 2 and the body styling part 1' arranged on the rear end 3 each have a number of light sources 10, which are arranged along a first longitudinal side 11 of an elongated optical unit (optical element 12). A second longitudinal side 13 of the elongated optical unit 12 opposite the first longitudinal side 11 has diffuser elements 14, by means of which light 15 emitted by the light sources 10 in the main direction of emission H of the device is coupled out. The predefined directional indicator light distribution is generated by means of the elongated optical unit 12. The elongated optical unit 12 is composed of lenses 17 arranged side by side, which preferably are connected to one another as a single piece.

The light sources 10 arranged in rows, and preferably arranged in a straight row, are controlled by means of a control unit in such a manner that a locally and/or temporally variable light emission and/or illuminated area is generated in the longitudinal extent 16 of the elongated optical unit 12. In this way, a sweeping turn signal or a chase light is generated in which the light sources 10 are switched on sequentially from the first end region 6, 8 to the second end region 7, 9 of the front end 2 or the rear end 3 or vice versa, depending on the change in travel direction to be signaled; to be precise, they are switched on in accordance with a switch-on direction E, which points in the travel direction of the vehicle 5 to be changed. If the travel direction "right," corresponding to a right turn, is to be indicated, then the light sources 10 are switched on sequentially to the right in the switch-on direction E, starting from the first end region 6 (left end region in the direction of travel), until all light sources 10 are switched on upon switch-on of the last light source 10 at the second end region 7 (right end region in the direction of travel). Subsequently, the sweep period is ended simultaneously with the switching off of all light sources 10. In the subsequent period, the light sources are again switched on sequentially in the switch-on direction E starting at the first end region 6. The directional indicator is thus generated solely by a sweeping light function in which the light sources 10 are switched on and off at a predetermined sweep frequency.

In an exemplary embodiment of the invention, the light sources 10 are not controlled with equal light intensity. For visual signaling of the direction of travel, light sources 10', which are last in a switch-on period and arranged at the front in the switch-on direction E, are illuminated with a greater light intensity than the light sources 10, which are switched on at the start of the sweep period. As is evident from FIG. 2, in the case of a "right" directional indicator, the lenses 17 of the elongated optical unit 12 that are associated with the light sources 10 in each case radiate greater light intensity in the second end region 7 than in the first end region 6, as is indicated by larger light arrows 15. For example, the light sources 10 that are switched on first can be switched on dimmed, while the light sources 10' that are switched on last can be operated at full load. This is illustrated by larger light arrows 15 in the second end region 7 according to FIG. 2.

In the present exemplary embodiment according to FIG. 2, the optical unit 12 consists of fourteen lenses 17 of equal size, which each have input optics 18 on the first longitudinal side 11 and output optics 14 on the second longitudinal side 13. In the exemplary embodiment according to FIG. 2, the last three light sources 10' in the switch-on direction E are operated at a greater light intensity than the light sources 10 switched on beforehand.

The light sources 10 can also be operated at the same luminous intensity.

According to an exemplary embodiment, a different number of light sources 10' switched on last in the switch-on direction E can also be operated at higher light intensity. The light sources 10' that are operated at a higher light intensity can be switched on simultaneously or sequentially in the switch-on direction E.

Figure 3:
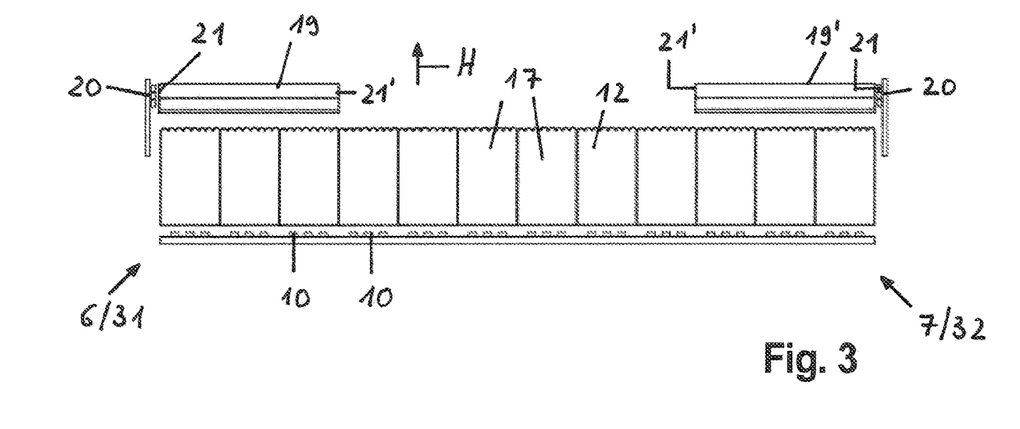
FIG. 3 shows a schematic top view of an alternative communication light device.
Figure 4:
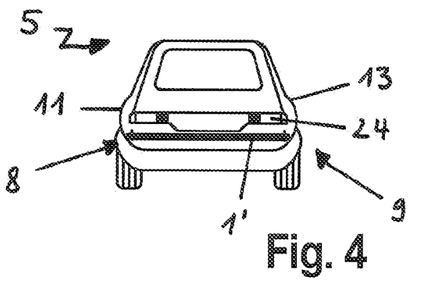
FIG. 4 shows a rear view of the vehicle containing the communication light device.

In accordance with another embodiment of the invention according to FIG. 3, a communication light device is shown that, in contrast to the preceding communication light device, additionally has a light guide 19, 19' in front of the elongated lens 12 in the main direction of emission H in the first end region 6 and the second end region 7 of the front end 2 or the first end region 8 and the second end region 9 of the rear end 3. Associated with the light guide 19, 19' is a second light source 20, which in each case extends at the height of ends of the front end 2 or 3.

The same components or component functions of the different exemplary embodiments are labeled with the same reference symbols.

The light guide 19 is arranged parallel to the elongated lens 12, but has a significantly shorter length than the elongated lens 12. The light guide 19 extends in the end region 6, 7 and 8, 9 of the front end 2 or rear end 3, which is less than one third the width of the vehicle 5. It thus covers and/or limits the first end region 6 and the second end region 7 of the front end 2 or the first end region 8 and the second end region 9 of the rear end 3.

The second light source 20 is associated with an end face 21 of the light guide 9 [sic; should be light guide 19], which end face serves as a light input surface. The light guide 19 has output elements, preferably on a back, so that light that is coupled in is deflected forward in the main direction of emission H by means of the output elements so that the light that is coupled in emerges from the light guide at a front longitudinal side 22 of the light guide 19. The light beams that do not strike the output elements continue in the light guide 19 through total reflection to an opposite end face 21", which can be designed to be reflective if appropriate.

The control unit is designed such that light sources 10 associated with the elongated lens 12 are switched on sequentially, analogous to a chase light, from one end region 6, 7, 8, 9 to the other end region 6, 7, 8, 9 by a controller, and after switch-on of the last light source to be switched on, all light sources 10 are switched off so that the same switch-on process now starts from the beginning in accordance with the sweep frequency. The second light sources 20 are switched on and off as a function of the directional indicator; as a function of the directional indicator direction, either the one light guide 19 or the other light guide 19' is switched on and off in accordance with a turn-signal frequency.

Preferably, switch-on of the second light source 20 takes place when the chase light, starting from the opposite end region, has reached the light guide 19 or 19' that is to be illuminated. This is the case when all light sources 10 that are not covered by the light guide 19, 19' to be lit are switched on sequentially. In this way, the end regions of the communication light device in which the travel direction is to be indicated can advantageously radiate light of higher intensity than in the remaining areas. Visual highlighting of the side in which the direction of travel is to be changed can be accomplished by this means.

For example, the sweep frequency of the switched-on light sources 10 is the same as the flash frequency of the second light sources 20. Alternatively, the sweep frequency can also be different from the flash frequency.

An optical axis of the second light sources 20 is perpendicular to the main direction of emission H of the vehicle indicator device or an optical axis of the first light sources 10.

It is a matter of course that the components of the body styling part 1, 1', namely the light sources 10 and 20 as well as the lens 12 and the light guides 19, 19', are arranged in a common housing. The housing of the body styling part 1, 1' thus formed is attached to the body of the vehicle 5 as a separate part. As is evident from FIG. 1, the body styling part 1 is located below conventionally arranged headlights 23 and taillights 24, and below a radiator grille body styling part 25.

Figure 5:
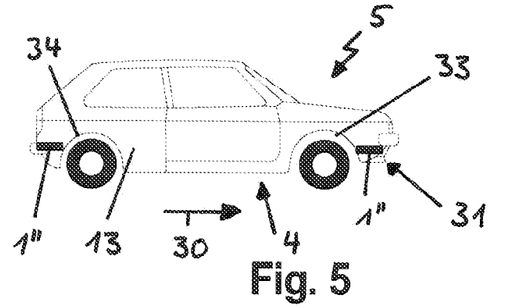
FIG. 5 shows a side view of the vehicle with the communication light device.

In addition to the body styling parts 1, 1', the communication light device can have additional body styling parts 1", which are arranged on the first longitudinal side 11 and on the second longitudinal side 13 of the vehicle 5, see FIG. 5. The additional body styling parts 1" run in the same horizontal plane as the body styling parts 1, 1', but enclose a right angle with the body styling parts 1, 1'. The additional body styling parts 1" permit an extension of the communication light devices arranged on the front and/or rear end of the vehicle 5. In contrast to the preceding exemplary embodiments, a first end 31 of the communication light device is not formed by the first end region 6, 8 of the front end 2 or rear end 3 and a second end 32 of the communication light device is not formed by the second end region 7, 9 of the front end 2 or rear end 3. Instead, the first end region 6, 8 of the front end 2 or rear end 3 and the second end region 7, 9 of the front end 2 or rear end 3 are located inside the elongated communication light device. Instead, the communication light device is designed to be segmented, wherein the body styling part 1 located on the front end 2 and the body styling part 1' located on the rear end 3 are implemented as a middle body styling part or middle segment. The first end 31 of the communication light device is formed by a first additional body styling part 1" that is arranged on the first longitudinal side 11 of the vehicle. The second end 32 of the communication light device is formed by a second additional body styling part 1" that is arranged on the second longitudinal side 13 of the vehicle 5. The front communication light device is composed of three segments, namely the middle body styling part 1 on the front and the additional body styling parts 1" on the longitudinal sides. The rear communication light device is likewise composed of three segments, specifically the rear body styling part 1' and the two adjoining body styling parts 1" on the longitudinal sides.

The light sources of the body styling parts 1, 1', 1" are controlled in such a manner that the sweeping light effect (chase light) for the front region of the vehicle 5 runs from one body styling part 1" (first outer segment) through the body styling part 1 arranged on the front end 2 (middle segment) to the opposite second body styling part 1" arranged on the other longitudinal side (outer segment). If, for example, the intent is to signal that the vehicle 5 in travel direction 30 intends to turn left, first the light sources 10 of the front body styling part 1" associated with the second longitudinal side 3 [sic; should be 13] are switched on sequentially, then the light sources 10 of the front body styling part 1 are switched on sequentially in the switch-on direction E to the second end region 7, and after that the light sources of the other side body styling part 1' arranged on the first longitudinal side 11 of the vehicle 5 are switched on sequentially. The switch-on direction E thus changes its direction. To start with, it is parallel to the vehicle longitudinal axis M. In a second section, it is perpendicular to the vehicle longitudinal axis M, and in a third section it is again parallel to the vehicle longitudinal axis M, wherein it is oriented in the opposite direction compared with the first section.

After a predetermined on-time of the last light source 10 of the communication light device to be switched on, all light sources 10 are switched off simultaneously so that a repeated sequential switching-on of the light sources 10, starting from the body styling part 1" on the second longitudinal side 13 of the vehicle 5, can take place subsequently. The controlling of the communication light device on the rear end 3 takes place in the same manner.

In addition to the body styling parts 1" arranged on the longitudinal side 11, 13 of the vehicle 5, additional body styling parts can be arranged between a front wheel well 33 and a rear wheel well 34 so that a signaling of the directional indicator that wraps around the vertical axis of the vehicle 5 is ensured.

Figure 6:
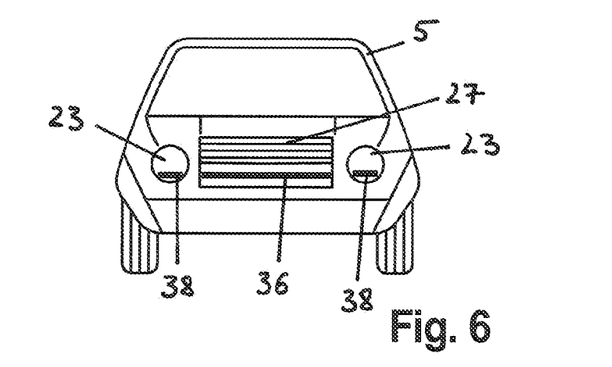
FIG. 6 shows a front view of the vehicle with an alternative communication light device.

In accordance with an example of the invention according to FIG. 6, the communication light device can be designed to be segmented in the front region of the vehicle 5, wherein a first directional indicator section 36 is arranged to be integrated into the radiator grille body styling part 27 and a second directional indicator section 38 is arranged to be integrated into the headlight 23.

Figure 7:
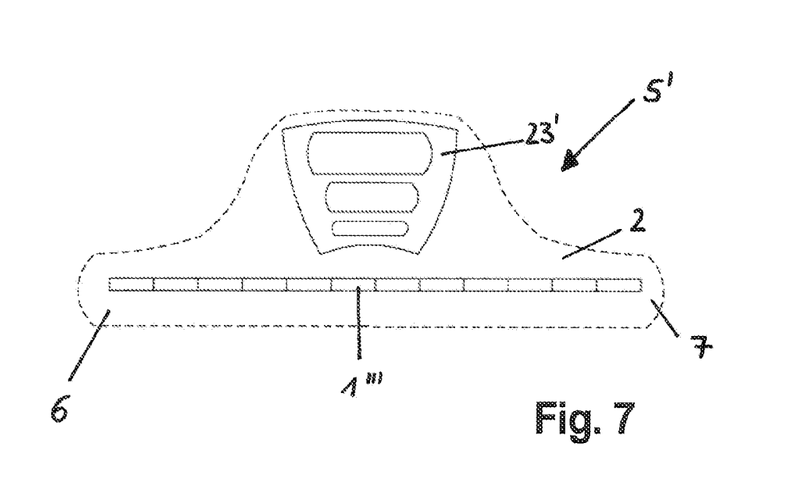
FIG. 7 shows a schematic front view of a multi-track vehicle with the communication light device.

In accordance with an example of the invention according to FIG. 7, a body styling part 1''' is integrated into a single-track vehicle 5' on the rear and front. The body styling part 1''' is arranged below a headlight 23' or a taillight, and extends from the first end region 6 to the second end region 7 of the front end 2. The configuration of the body styling part 1''' corresponds essentially to the configuration of the body styling part 1.

In accordance with an example of the invention, a communication light device for vehicles is provided that differs from the preceding exemplary embodiments of the communication light device in that the light emission of the body styling parts 1, 1', 1", 1''' takes place simultaneously in accordance with a turn-signal frequency. No sweeping function (chase light) is provided. Only the light sources 10 of the body styling parts 1, 1', 1", 1''' that are arranged on the right or left side with respect to a vehicle longitudinal axis are switched on and off periodically, and consequently are intended to signal the change in travel direction accordingly.

In accordance with one embodiment of the invention, the body styling parts 1, 1''' of the front communication light device can be attached to a front end module to which heat exchangers as well as the radiator grille body styling part 25 are also attached along with the headlight and taillights. The front end module is connected to the body of the vehicle by a fastener.

Figure 8:
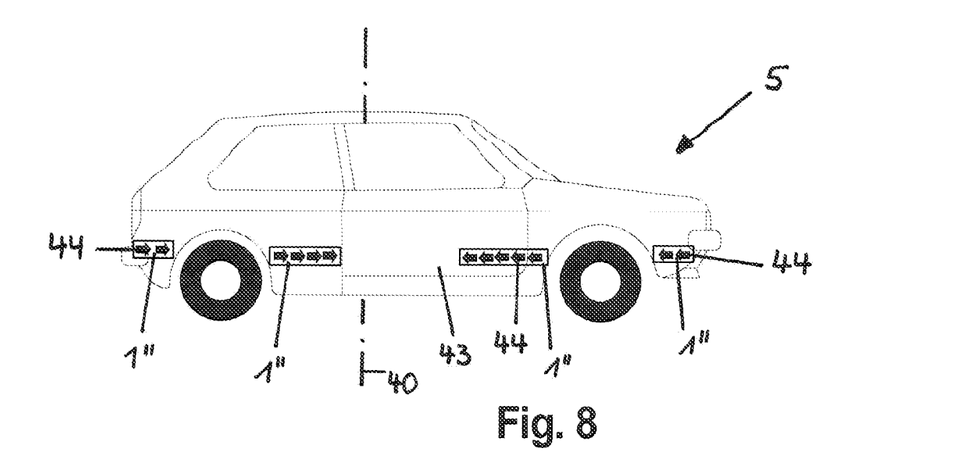
FIG. 8 shows a side view of the vehicle with a wraparound communication light device.
Figure 9:
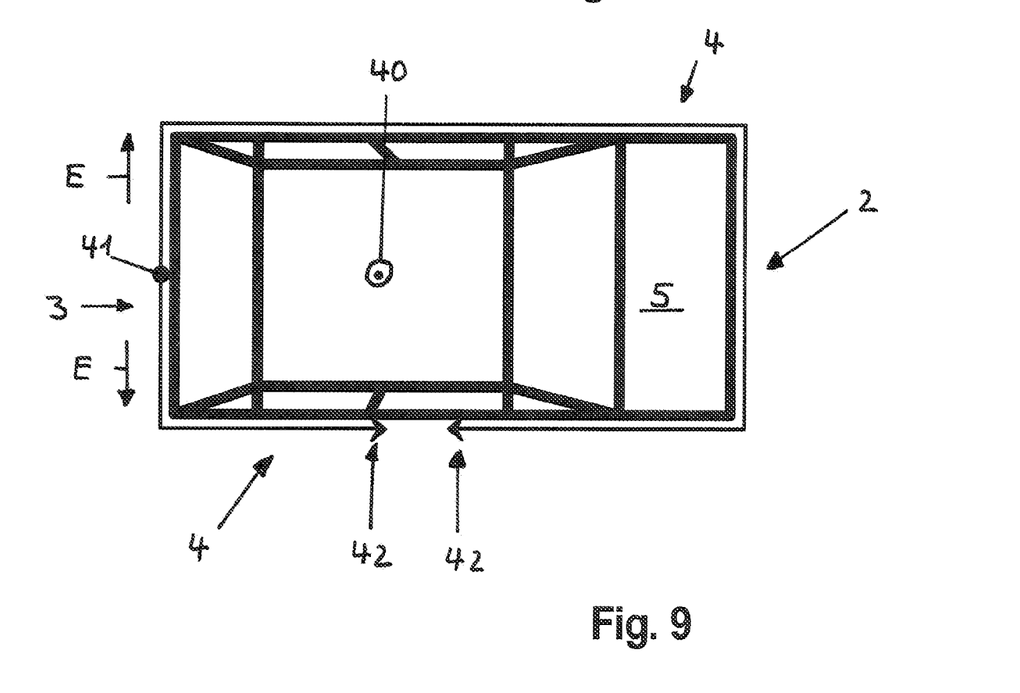
FIG. 9 shows a top view of the vehicle.

In accordance with an example of the invention according to FIG. 8, in contrast to the embodiment from FIG. 5, the body styling parts 1" are arranged across the entire longitudinal side 11, 13 of the vehicle. The result is thus a continuous communication light device wrapping around a vertical axis 40 of the vehicle and consisting of the front body styling part 1 (front segment), the rear body styling part 1' (rear segment), as well as the side body styling parts 1" (side segments). As a function of a vehicle status, all segments of the body styling parts 1, 1', 1" are switched on sequentially and periodically in the switch-on direction E, beginning with a starting point 41 on the rear body styling part 1' to an end point, and preferably are switched off simultaneously. The starting point 41 is arranged on the rear end of the vehicle in the present exemplary embodiment. Starting from there, the chase light begins simultaneously across the left longitudinal side and the right side up to the end 42, which is located on a right-hand door 34 in the vehicle direction. In the present example, it is assumed that the vehicle driver has forgotten to close the passenger door 43 after parking the vehicle. Upon activation of the locking function of his remote control, the communication light device is switched on, and the still-unlatched passenger door 43 is pointed out by means of illuminated symbols 44 in the form of arrows lighting up via the segments.

Beginning with the starting point 41, the switch-on directions E run in opposite directions until they have reached their endpoint. The end 42 of the two branches of the chase light can be identical or can be arranged at a distance from one another as in the present exemplary embodiment.

For example, light sources of different colors can be provided so that the chase light appears in red, for example. In accordance with another embodiment, a greeting chase light can appear in blue, for example, in order to indicate, e.g., the driver's door to the drivers.

In accordance with an example of the invention, the segments can also be controlled such that the segments are switched on sequentially and periodically in a single switch-on direction E about the vertical axis, wherein the end of the chase light is arranged in the region that is to be pointed out.

In accordance with an example of the invention, instead of a single elongated optical unit, the body styling parts 3, 3', 3" have multiple elongated optical units running parallel to one another, each of which has light sources associated with it. In this way, a multi-line character can be brought about in creating the light signature. Consequently, different illuminated signatures can be signaled, for example an arrow direction pointing one way and an arrow direction pointing the other way. On the other hand, illuminated signatures can also be generated that are composed of partial illuminated signatures. For example, a particular symbol can be formed by the superposition of multiple partial illuminated signatures. The illuminated signature can be displayed statically or dynamically. In the case of static display of illuminated signatures, a locally variable light emission or illuminated area occurs in the extent of the optical unit.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A communication light device for a vehicle, the device comprising:
    at least two light sources;
    an elongated optical unit for generating a light signature; and
    a control unit for controlling the at least two light sources such that a locally and/or temporally variable light emission and/or illuminated area is generated in a longitudinal extent of the elongated optical unit,
    wherein the communication light device arranged on an exterior of the vehicle body and extends in a horizontal direction all the way along a front end and/or all the way along a rear end of the vehicle and/or all the way along or partially along longitudinal sides of the vehicle, and
    wherein the elongated optical unit has a light guide that is arranged on each of a first end region and a second end region of the front end of the vehicle and/or each of a first end region and a second end region of the rear end of the vehicle, wherein a second light source is associated with the light guide, wherein the second light source is arranged at an end of the light guide facing away from a vehicle longitudinal center plane, and wherein the control unit has a controller so that the second light source of each light guide are not switched on and off periodically until light sources of the at least two light sources, that are covered by the light guide in a main direction of emission of the light, are switched on sequentially in a switch-on direction.

2. The communication light device according to claim 1, wherein the communication light device is segmented,
    wherein a front segment of the communication light device has a first body styling part extending between the first end region and the second end region of the front end of the vehicle and a second body styling part arranged in a front end of each of the longitudinal sides of the vehicle, such that the front segment of the communication light device has the first body styling part and two of the second body styling part, and
    wherein a rear segment of the communication light device has a first body styling part extending between the first end region and the second end region of the rear end of the vehicle and a second body styling part arranged in a rear end of each of the longitudinal sides of the vehicle, such that two of the second body, such that the rear segment of the communication light device has the first body styling part and two of the second body styling part.

3. The communication light device according to claim 1, wherein the communication light device is segmented, wherein a first segment of the communication light device is integrated into a radiator grille body styling part and a second segment of the communication light device is integrated into each of two headlights of the vehicle.

4. The communication light device according to claim 1, wherein the communication light device includes a single body styling part that extends from the first end region to the second end region of the front end of the vehicle and another single body styling part that extends from the first end region to the second end region of the rear end of the vehicle.

5. The communication light device according to claim 1, wherein the elongated optical unit comprises a linear lens, wherein a first longitudinal side of the elongated optical unit is associated with at least two light sources arranged in rows, and wherein a second longitudinal side of the elongated optical unit, which is parallel to the first longitudinal side, forms a linear light output surface at which the light is coupled out in the main direction of emission.

6. The communication light device according to claim 5, wherein the control unit has the controller so that each row of light sources is switched on from a first end of the row to a second end of the row in sequence individually or in groups, or each row of light sources is switched on, such that a first end of the row is dimmed with an area-by-area increase of an illumination intensity in a switch-on direction towards the second end of the row.

7. The communication light device according to claim 1, wherein the sequential switch-on/switch-off frequency of the light sources of the at least two light sources that are covered by the light guide corresponds to a switch-on/switch-off frequency of the second light source.

8. The communication light device according to claim 1, wherein an optical axis of the second light source is substantially perpendicular to an optical axis of the at least two light sources.

9. The communication light device according to claim 1, wherein the at least two light sources, the second light source, the light guide, and the elongated optical unit are built into a single housing.

10. The communication light device according to claim 1, wherein the communication light device is segmented, wherein a front segment on the front end of the vehicle, a rear segment on the rear end of the vehicle, and side segments on each of the longitudinal sides of the vehicle wrap around a vertical axis, and wherein the controller of the control unit is provided so that the front, rear and side segments are switched on periodically and with a time shift in a switch-on direction, beginning at a start to an end of the vehicle as a function of a vehicle status.

11. The communication light device according to claim 1, wherein the at least two light sources are controlled such that they are continued in two different switch-on directions from a start of an illuminated graphic up to an end of the illuminated graphic, wherein ends of two branches of the illuminated graphic coincide or are arranged at a distance from one another.

12. The communication light device according to claim 11, wherein the illuminated graphic is formed by illuminated symbols arranged one after the other in the two different switch-on directions.

13. The communication light device according to claim 11, wherein the at least two light sources are provided in different colors so that the illuminated graphic is adapted to be illuminated at least partially in the different colors.

14. The communication light device according to claim 1, wherein the communication light device has a plurality of elongated optical units running parallel to one another and light sources associated therewith in order to display different illuminated signatures or in order to display partial illuminated signatures that are superimposed to form an illuminated signature.

* * * * *